United States Patent

Aizawa et al.

Patent Number: 5,249,447
Date of Patent: Oct. 5, 1993

[54] PROCESS FOR PREPARATION OF THICKNESS-REDUCED DEEP-DRAW-FORMED CAN

[75] Inventors: Masanori Aizawa, Yokohama; Tetsuo Miyazawa, Ayase; Katsuhiro Imazu; Seishichi Kobayashi, both of Yokohama; Hiroshi Ueno, Yokosuka, all of Japan

[73] Assignee: Toyo Seikan Kaisha Ltd., Tokyo, Japan

[21] Appl. No.: 22,859

[22] Filed: Feb. 25, 1993

Related U.S. Application Data

[63] Continuation of Ser. No. 582,854, filed as PCT/JP90/00190, Feb. 16, 1990, published as WO/03388, Aug. 23, 1990, abandoned.

Foreign Application Priority Data

Feb. 16, 1989 [JP] Japan .................................. 1-35005

[51] Int. Cl.⁵ .............................................. B21C 27/02
[52] U.S. Cl. .......................................... 72/46; 72/349; 72/379.4
[58] Field of Search ................. 72/46, 347, 349, 350, 72/379.4, 364; 427/388.1

[56] References Cited

U.S. PATENT DOCUMENTS

| | | | |
|---|---|---|---|
| 3,206,848 | 9/1965 | Rentmeester | 72/46 |
| 4,425,778 | 1/1984 | Franek et al. | 72/347 |
| 4,499,750 | 2/1985 | Gerber et al. | 72/349 |

FOREIGN PATENT DOCUMENTS

| | | | |
|---|---|---|---|
| 2387706 | 12/1978 | France | 72/349 |
| 51-63787 | 6/1976 | Japan . | |
| 0065579 | 5/1977 | Japan | 427/388.1 |
| 57-23584 | 5/1982 | Japan . | |
| 59-34580 | 8/1984 | Japan . | |
| 60-170532 | 9/1985 | Japan . | |
| 63-94543 | 5/1987 | Japan . | |
| 2252613 | 11/1987 | Japan | 72/46 |
| 63-62729 | 3/1988 | Japan . | |

*Primary Examiner*—Lowell A. Larson
*Assistant Examiner*—Michael J. McKeon
*Attorney, Agent, or Firm*—Sughrue, Mion, Zinn, Macpeak & Seas

[57] ABSTRACT

Disclosed is a process for the preparation of a thickness-reduced deep-draw-formed can, which comprises the steps of (i) coating a crystalline thermoplastic resin on a metal plate, (ii) heating the coated metal plate at a temperature higher than the glass transition point (Tg) of the thermoplastic resin and draw-forming the coated metal plated, and (iii) heating the obtained preliminarily drawn cup at a temperature higher than the glass transition temperature (Tg) of the thermoplastic resin and redrawing the cup at a bend-pulling speed of at least 1 m/min. According to this process, damage of the coating layer can be drastically moderated, and a deep-draw-formed can having prominently improved corrosion resistance and heat resistance can be obtained.

4 Claims, 4 Drawing Sheets

PROCESS FOR PREPARATION OF THICKNESS-REDUCED DEEP-DRAW-FORMED CAN

This is a continuation of application Ser. No. 07/582,854 filed as PCT/JP90/00190, Feb. 16, 1990, published as WO/03388, Aug. 23, 1990, now abandoned.

DESCRIPTION

1. Technical Field

The present invention relates to a process for the preparation of a thickness-reduced deep-draw-formed can. More particularly, the present invention relates to a process for preparing a thickness-reduced deep-draw-formed can by redrawing a preliminarily drawn cup of a coated metal plate, in which damage of the coating layer is drastically moderated and a deep-draw-formed can having prominently improved corrosion resistance and heat resistance is obtained.

2. Technical Background

As the conventional side seamless can, there can be mentioned a product formed by subjecting a metal blank such as an aluminum plate, a tinplate or a tin-free steel plate to an ironing operation in at least one stage between a drawing die and a punch to form a cup comprising a side seamless barrel and a bottom connected integrally and seamlessly to the barrel, and if desired, subjecting the barrel to an ironing operation between an ironing punch and an ironing die to reduce the thickness of the barrel of the vessel. It also is known that the thickness of the side wall can be reduced by bending-elongation by a curvature corner portion of the redrawing die instead of the above-mentioned ironing operation (see Japanese Unexamined Patent Publication No. 56-501442).

In order to save a vessel material and prepare a can having a large can height from a certain quantity of a metal blank, it is preferred that the thickness of a barrel portion of a vessel be reduced by ironing or by bending elongation.

As the method for forming an organic coating on a side seamless can, there can be mentioned not only a method broadly adopted in the art, in which an organic paint is applied to a formed can, but also a method a resin film is laminated on a metal blank before the forming. As an example of the latter method, Japanese Examined Patent Publication No. 59-34580 proposes a method in which a metal plate laminated with a film of a polyester derived from terephthalic acid and tetramethylene glycol is used. It also is known that in the production of a redraw-formed can by bending elongation, a metal plate coated with a vinyl organosol, epoxy, phenolic, polyester or acrylic paint can be used.

However, the conventional method for the production of a coated can having a thickness-reduced side wall is defective in that the corrosion resistance of an organic coating applied to a metal plate in advance is drastically degraded by the forming operation.

More specifically, the organic coating is readily damaged by a tool diring the side wall thickness-reducing forming operation, apparent or latent exposure of the metal is caused at the damaged part of the coating, and elution of the metal or corrosion is caused from this damaged part. In the production of a seamless can, there is produced such a plastic flow as increasing the size in the height direction of a can and diminishing the size in the circumferential direction of the can, and by this plastic flow, the adhesive force between the surface of the metal and the organic coating is reduced, and furthermore, this adhesive force is reduced with the lapse of time by the residual strain in the organic coating. This tendency becomes conspicuous when a content is hot-filled in the can or the filled can is subjected to heat sterilization at a low or high temperature.

It is therefore a primary object of the present invention to provide a process for preparing a side wall thickness-reduced deep-draw-formed can from a metal plate having an organic coating, which has an excellent coating completeness, an excellent adhesion of the coating, an excellent corrosion resistance and an excellent heat resistance.

DISCLOSURE OF THE INVENTION

In accordance with the present invention, there is provided a process for the preparation of a thickenss-reduced deep-draw-formed can, which comprises the steps of coating a crystalline thermoplastic resin on a metal plate, heating the coated metal plate at a temperature higher than the glass transition point (Tg) of the thermoplastic resin and draw-forming the coated metal plate, and heating the obtained preliminarily drawn cup at a temperature higher the glass transition temperature (Tg) of the thermoplastic resin and redrawing the cup at a bend-pulling speed of at least 1 m/min.

In the process for the preparation of a deep-draw-formed can according to the present invention, it is preferred that the thermoplastic resin of the barrel wall be molecularly oriented sot hat the thermoplastic resin has an orientation degree of 30 to 90% as determined according to the X-ray diffraction method.

The process for the preparation of a deep-draw-formed can according to the present invention is prominently characterized in that a metal plate is coated with a crystalline thermoplastic resin, the temperatures of the coated metal plate and drawn cup are selected within certain ranges, and the bend-pulling speed is maintained at a certain high level.

If a crystalline thermoplastic resin is used as the organic coating, in the case where the metal plate having an organic coating is deep-draw-formed to reduce the thickness, by heating the coated metal plate and drawn cup at temperatures higher than the glass transition point (Tg), the coating resin can show a good processability capable of folllowing up with the metal blank by dint of high strength and high elongation possessed by the thermoplastic resin, and the organic coating is not damaged by a tool or the like.

In order to improve the corrosion resistance and heat resistance of the coating per se, it is important that the organic coating should be crystalline and be molecularly oriented. In general, permeation of various components through an organic resin is caused through an amorphous portion in the resin. In the present invention, since a crystalline thermoplastic resin is sued for the resin coating and this thermoplastic resin is subjected to bend-pulling processing at a high speed, the barrier property to corrosive components can be prominently improved. If a highly crystalline resin is sued and the resin is highly molecularly oriented, the heat resistance of the coating per se is prominently improved over the heat resistance of a coating of an amorphous or unoriented resin.

At the high speed processing, heat is generated, presumably owing to the internal friction, and the orientation is effected at a higher temperature and reduction of the strain and thermal setting of the orientation can be easily accomplished.

PREFERRED EMBODIMENTS OF THE INVENTION MATERIALS

Figure 1A:
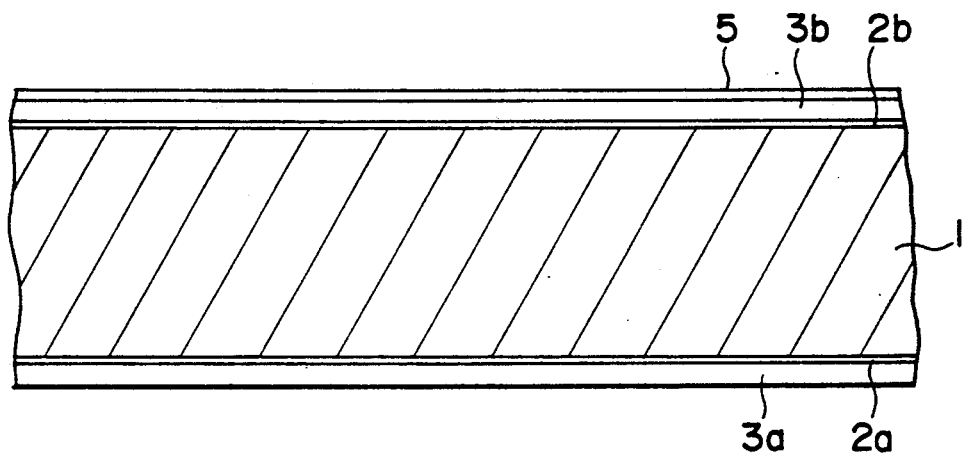
FIGS. 1a and 1b are sectional views showing embodiments of the coated metal plate preferably used in the present invention.

Various surface-treated steel plates and plates of light metals such as aluminum can be used as the metal substrate.

A steel plate formed by annealing a cold-rolled steel plate, subjecting the annealed steel plate to secondary cold rolling and subjecting the steel plate to at least one of zinc deposition, tin deposition, nickel deposition, electrolytic chromate treatment and chromate treatment can be used as the surface-treated steel plate. An electrolytically chromate-treated steel plate is preferably used as the surface-treated steel plate, and an electrolytically chromate-treated steel plate comprising 10 to 200 mg/m$^2$ of a metallic chromium layer and 1 to 50 mg/m$^2$ (as calculated as metallic chromium) of a chromium oxide layer is especially preferably used. This surface-treated steel plate is excellent in the combination of the adhesion of the coating and the corrosion resistance. Another example of the surface-treated steel plate is a tinplate having a deposited tin amount of 0.5 to 11.2 g/m$^2$. Preferably, this tinplate is subjected to a chromate treatment or a chromate/phosphate treatment so that the chromium amount as calculated as metallic chromium is 1 to 30 mg/m$^2$.

Still another example of the surface-treated steel plate is an aluminum-coated steel plate formed by deposition of aluminum or pressure welding of aluminum.

As the light metal plate, there can be used not only a so-called pure aluminum plate but also an aluminum alloy plate. An aluminum alloy having excellent corrosion resistance and processability comprises 0.2 to 1.5% by weight of Mn, 0.8 to 5% by weight of Mg, 0.25 to 0.3% by weight of Zn and 0.15 to 0.25% by weight of Cu, with the balance being Al. It is preferred that the light metal plate be subjected to a chromate treatment or a chromate/phosphate treatment so that the chromium amount as calculated as metallic chromium is 20 to 300 mg/m$^2$.

The blank thickness ($t_B$) of the metal plate differs according to the kind of the metal and the use or size of the vessel, but it is generally preferred that the blank thickness be 0.10 to 0.50 mm, especially 0.10 to 0.30 mm in case of a surface-treated steel plate or 0.15 to 0.40 mm in case of a light metal plate.

As the crystalline thermoplastic resin coated on the metal plate, there can be used, for example, olefin resins such as polyethylene, polypropylene, an ethylene/propylene copolymer, an ethylene/vinyl acetate copolymer, an ethylene/acrylic ester copolymer and an ionomer, polyesters such as polyethylene terephthalate, polybutylene terephthalate, an ethylene terephthalate/isophthalate copolymer, ethylene terephthalate/adipate copolymer, an ethylene terephthalate/sebacate copolymer and a butylene terephthalate/isophthalate copolymer, polyamides such as nylon 6, nylon 6,6, nylon 11 and nylon 12, a polyvinyl chloride, and a polyvinylidene chloride.

In order to hide the metal plate and assist the transfer of a blank holder force to the metal plate at the draw-redraw forming step, an inorganic filler (pigment) can be incorporated in the coating layer of the thermoplastic resin in the present invention.

As the inorganic filler, there can be mentioned inorganic white pigments such as rutile or anatase titanium dioxide, zinc flower and gloss white, white extender pigments such as baryta, precipitated baryta sulfate, calcium carbonate, gypsum, precipitated silica, aerosil, talc, fired or unfired clay, barium carbonate, alumina white, synthetic or natural mica, synthetic calcium silicate and magnesium carbonate, black pigments such as carbon black and magnetite, red pigments such as red iron oxide, yellow pigments such as sienna, and blue pigments such as prussian blue and cobalt blue. The inorganic filler can be incorporated in an amount of 10 to 500% by weight, especially 10 to 300% by weight, based on the resin.

Figure 1B:
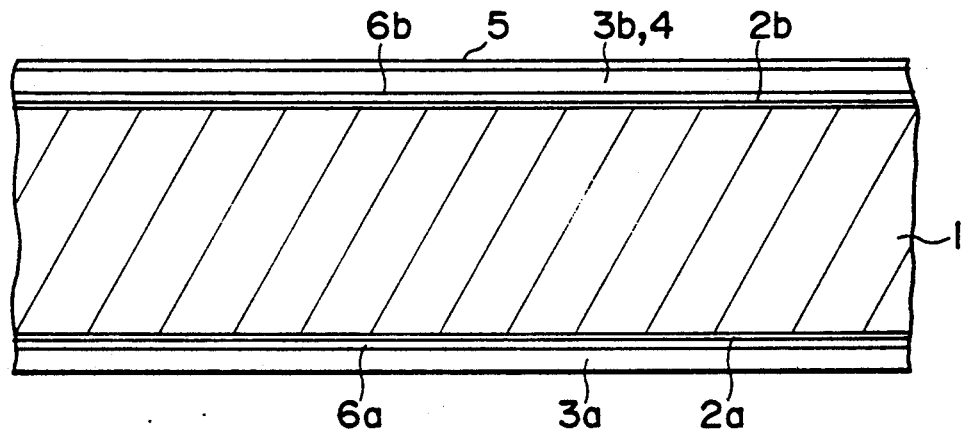

FIG. 1-A shows an example of the coated metal plate preferably used in the present invention. Chemical formation films 2a and 2b, such as caromate-treated films, are formed on both the surfaces of a metal substrate 1, and an inner face protecting coating layer 3a is formed on the surface to be formed into the inner face of the final can through the chemical formation film 2a, while a protecting coating layer 3b or an outer face coating comprising a white coating 4 and a transparent varnish 5 is formed on the surface to be formed into the outer face of the final can through the chemical formation film 2b.

Referring to FIG. 1-B showing another example, the sectional structure of this example is substantially the same as the sectional structure shown in FIG. 1-A, but is different in that adhesive layers 6a and 6b are interposed between the chemical formation films 2a and 2b formed on both the surfaces of the metal blank 1 and the inner face and outer face protecting layers 3a and 3b, respectively.

Coating Step

Coating of the coating resin to the metal plate can be accomplished by the heat fusion bonding method, the dry lamination method, the extrusion coating method or the like. In the case where the adhesiveness (heat fusion bondability) between the coating resin and the metal plate is poor, an adhesive, for example, a urethane adhesive, an epoxy adhesive, an acid-modified olefin resin adhesive, a copolyamide adhesive or a copolyester adhesive, can be interposed.

It is preferred that the thickness of the crystalline thermoplastic resin be 3 to 50 μm, especially 5 to 40 μm.

In case of the heat fusion bonding using a film, the film can be an undrawn film or a drawn film.

Draw-Redraw Forming Step

Figure 2:
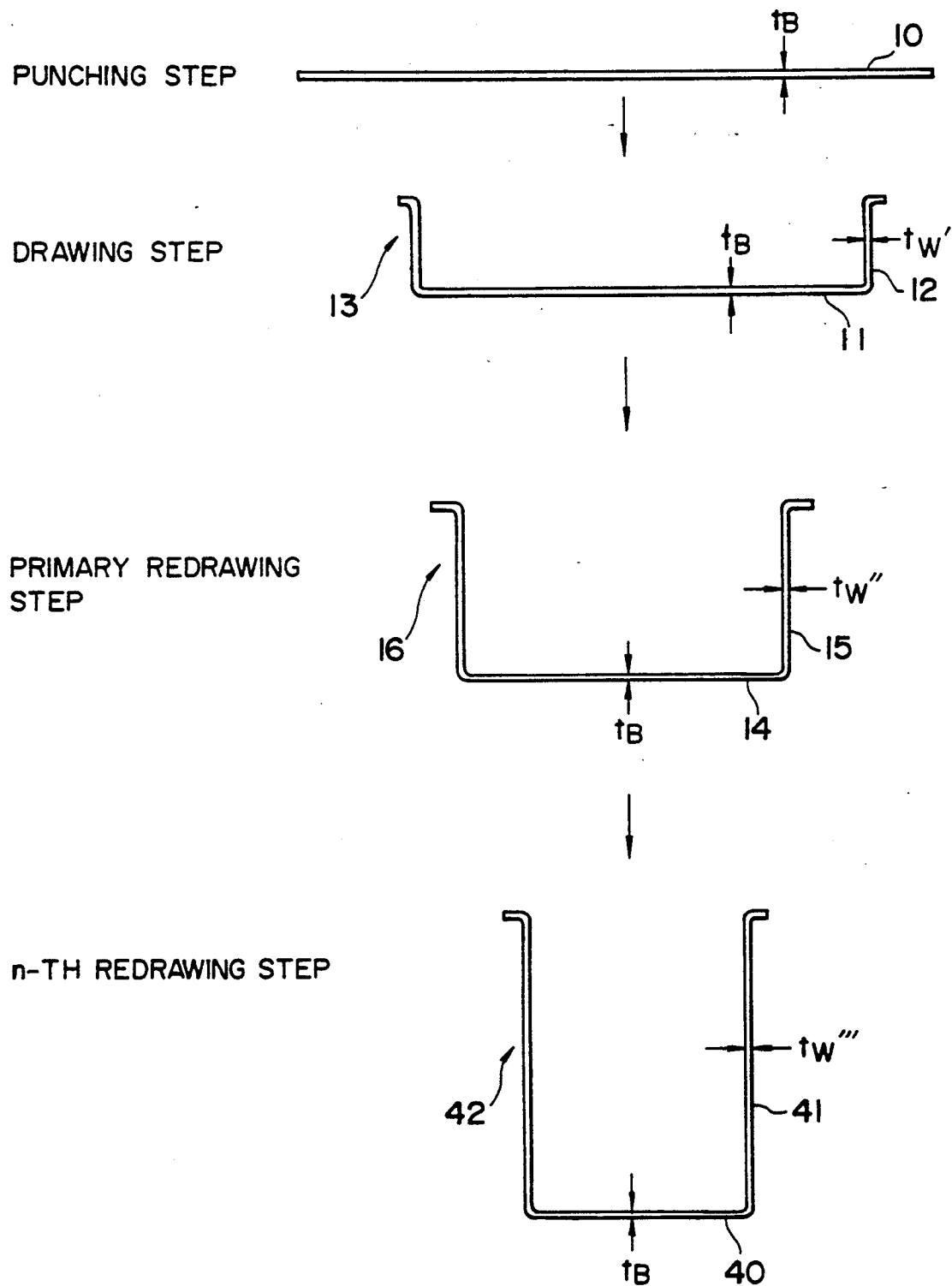
FIG. 2 is a sectional view illustrating the forming step of the present invention.

Referring to FIG. 2 illustrating the forming process of the present invention, a disk 10 having a thickness $t_B$ is punched from the above-mentioned coated metal plate at the punching step.

At the subsequent drawing step, the disk 10 is draw-formed into a shallow-draw-formed cup 13 comprising a bottom 11 having a thickness $t_B$ and a large diameter and a side wall 12 having a thickness tw' and a low height.

At this drawing step, the coated metal plate is preliminarily heated at a temperature higher than the glass transition point (Tg) of the crystalline thermoplastic resin, especially lower than the heat crystallization temperature. By carrying out the draw forming at a temperature within the above-mentioned range, as pointed out hereinbefore, the plastic flow of the coating resin layer is easily caused, and therefore metal exposure by breaking or cracking is effectively avoided.

Heating is easily accomplished by such means as blowing of hot air or high-frequency induction heating. It is preferred that the draw ratio at this drawing step be from 1.2 to 1.9, especially from 1.3 to 1.8. Incidentally, the draw ratio is defined by the following formula:

Draw ratio=(diameter of blank)/(diameter of shallow-draw-formed can).     (1)

According to the present invention, it is important that the shallow-draw-formed cup 13 obtained at the above-mentioned step should be heated, as at the above drawing step, at a temperature higher than the glass transition point (Tg) of the crystalline thermoplastic resin, especially lower than the heat crystallization temperature, and thickness-reducing redraw-forming should be carried out in the state where the plastic flow of the coating resin layer is easily caused.

By dint of this feature, damage of the coating resin layer often caused because of so-called shock lines at the redrawing step can be prevented, and the continuity and uniformity of the resin layer covering the entire can barrel are improved and metal exposure is controlled.

In the present invention, the shallow-draw-formed cup 13 obtained at the above-mentioned step is subjected to redraw forming to obtain a redraw-formed cup 16 comprising a bottom 14 having a thickness $t_B$ and a diameter smaller than the diameter of the bottom of the shallow-draw-formed cup and a side wall 15 having a thickness tw' and a height larger than the height of the side wall of the shallow-draw-formed cup. The side wall 15 of the redraw-formed cup 16 is bent and pulled to reduce the thickness to tw" which is smaller than $t_B$ and tw'.

Figure 3:
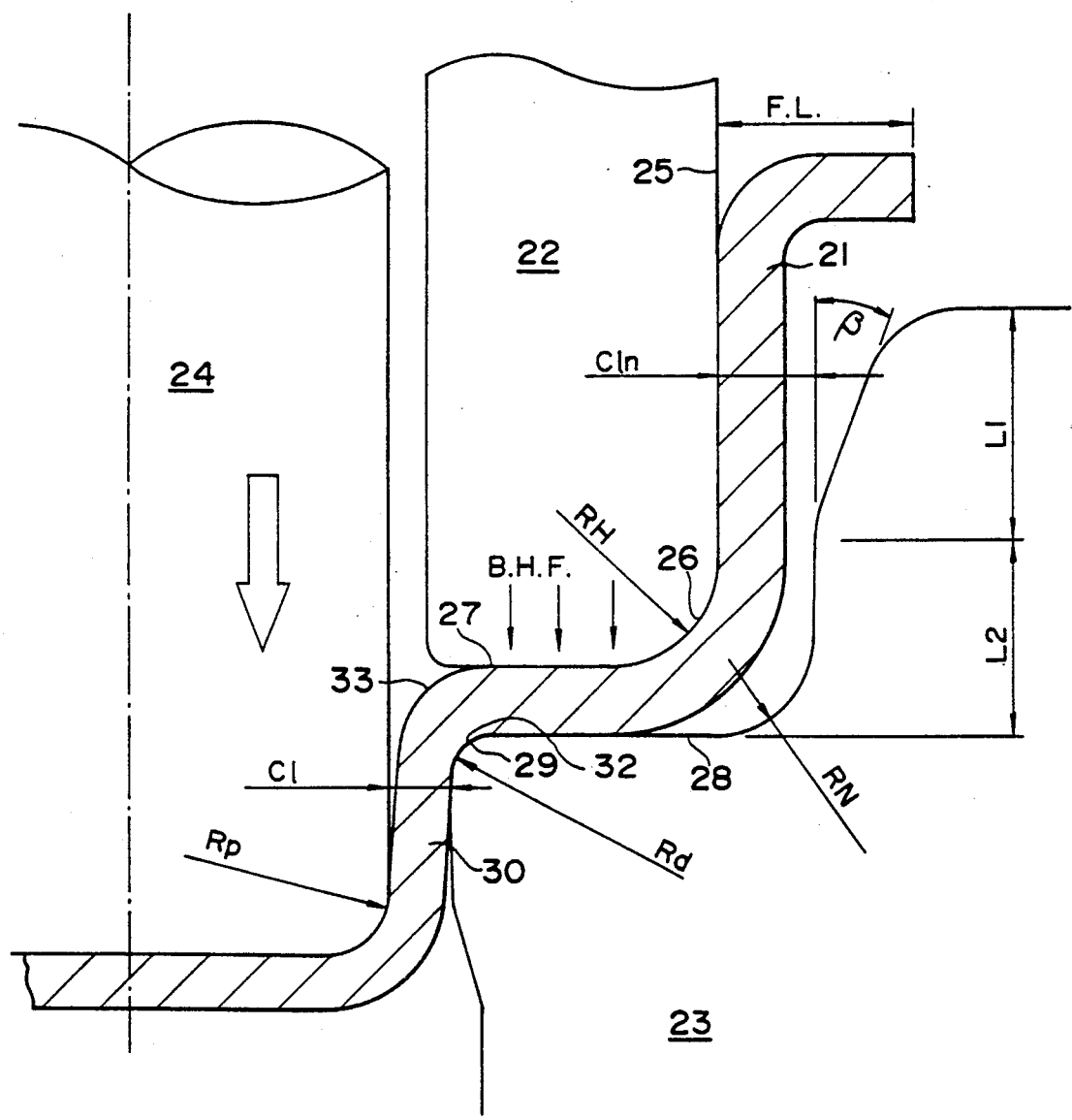
FIG. 3 is a sectional view illustrating the redrawing process of the present invention.

Referring to FIG. 3 illustrating the redrawing process in detail, a preliminarily drawn cup 21 formed of a coated metal plate is held by an annular holding member 22 inserted in the cup 21 and a redrawing die 23 located below. A redrawing punch 24 is arranged coaxially with the holding member 22 and redrawing die 23 so that the redrawing punch can come into the holding member 22 and come out therefrom. The redrawing punch 24 and redrawing die 23 are relatively moved so that they are engaged with each other.

By this relative movement, the side wall of the preliminarily drawn cup 21 is vertically bent inwardly with respect to the radius by an outer circumferential face 25 of the annular holding member 22 through a curvature corner portion 26 thereof, and the side wall of the cup 21 is passed through a portion defined by an annular bottom face 27 of the annular holding member 22 and a top face 28 of the redrawing die 23 and is bent substantially vertically to the axial direction by a working corner portion 29 of the redrawing die 23, whereby a deep-draw-formed cup 30 having a diameter smaller than the diameter of the preliminarily drawn cup 21 is prepared and simultaneously, the thickness of the side wall is reduced by the bending pulling.

In the production of a deep-draw-formed can according to the present invention, if the curvature radius $R_D$ of the working corner of the redrawing die is adjusted to a value 1 to 2.9 times, especially 1.5 to 2.9 times, the blank thickness $t_B$ of the metal plate, bending pulling can be effectively performed. Furthermore, the thickness unevenness of the side wall between the lower and upper parts thereof is eliminated, and the thickness can be uniformly reduced in the entire side wall.

Good results can be obtained when the degree of the thickness of the side wall of the can, that is, the thickness reduction ratio, is 5 to 45%, especially 5 to 40%, of the blank thickness ($t_B$).

Figure 4:
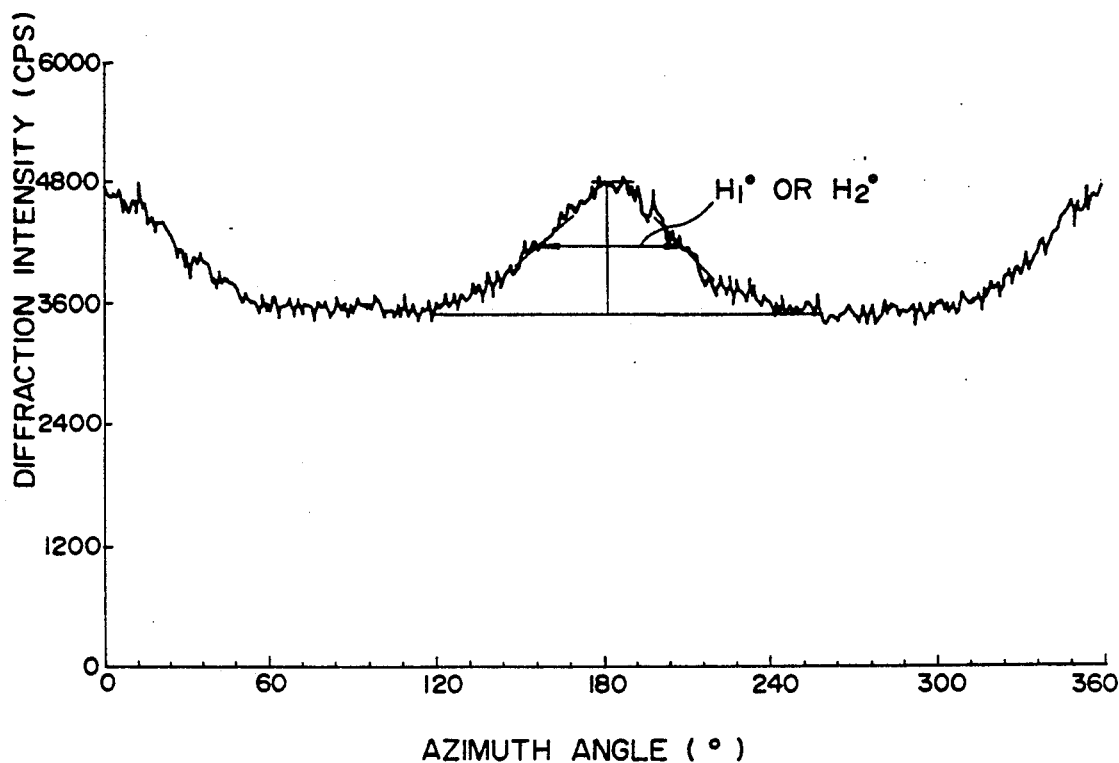
FIG. 4 is a curve illustrating an example of the X-ray diffraction intensity distribution.

Referring to FIG. 4 illustrating the principle of bending pulling, the coated metal plate 21 is forcibly bent under a sufficient back tension along the working corner 29 of the redrawing die having a curvature radius $R_D$. In this case, a strain is not produced in a surface 32 on the working corner of the coated metal plate 21, but a surface 33 on the side opposite to the working corner undergoes a strain by pulling. Supposing that curvature radius of the working corner is $R_D$ and the plate thickness is t, this strain quantity $\epsilon_s$ is given by the following formula:

$$\epsilon_s = \frac{2\pi(R_D + t) - 2\pi R_D}{2\pi R_D} \quad (2)$$

$$= \frac{t}{R_t}$$

The surface (inner surface) 33 of the coated metal plate is elongated by $\epsilon_s$ at the working corner, and the other surface (outer surface) 32 is elongated by a strain quantity which is equal to by the back tension just below the working corner.

If the coated metal plate is thus bent and pulled, the thickness of the coated metal plate is reduced, and the thickness change ratio $\epsilon_t$ is given by the following formula:

$$\epsilon_t = \frac{-t}{R_D + t} \quad (3)$$

From the above formula (3), it is seen that decrease of the curvature radius $R_D$ of the working corner is effective for reducing the thickness of the coated metal plate. Namely, it is understood that as $R_D$ is decreased, the thickness change $\epsilon_t$ is increased. It will also be understood that supposing that the curvature radius $R_D$ is constant, as the thickness t of the coated metal plate is increased, the thickness change $\epsilon_t$ is increased.

This redraw-forming is generally carried out in a plurality of stages, and by this multi-staged redraw-forming, the thickness of the side wall is reduced and the thickness of the entire side wall is made more uniform. At the final n-th redrawing step, a deep-draw-formed can 42 comprising a bottom 40 having a thickness $t_B$ and a small diameter and a side wall 41 having a thickness of tw''' and a large height is obtained.

In the present invention, in order to attain molecular orientation of the resin coating, it is important that the processing speed, that is, the relative movement speed between the redrawing punch and redrawing die, should be adjusted to at least 1 m/min, especially 1 to 200 m/min. By this increase of the processing speed, a violent plastic flow is generated in the coating resin layer, and heat is generated in the resin by the internal friction of the resin per se, with the result that the coating resin layer is highly oriented at a higher temperature and reduction of the strain and heat setting of the orientation are easily accomplished to improve the corrosion resistance and heat resistance.

At a low processing speed outside the scope of the present invention, the above-mentioned effect by generation of heat in the coating resin layer cannot be expected and the corrosion resistance and heat resistance are not substantially improved.

The monoaxial orientation degree of the resin coating can be evaluated based on the average orientation degree defined by the following formula:

$$F = \frac{1}{2} \times \left( \frac{180° - H_1°}{180°} + \frac{180° - H_2°}{180°} \right) \times 100 \; (\%)$$

wherein $H_1°$ and $H_2°$ represent half widths (°) of the diffraction intensity distribution curve (FIG. 4) along the Debye-Scherrer ring of the strongest diffraction plane [(010)] measured by the transmission method using CuKα rays.

Figure 5:
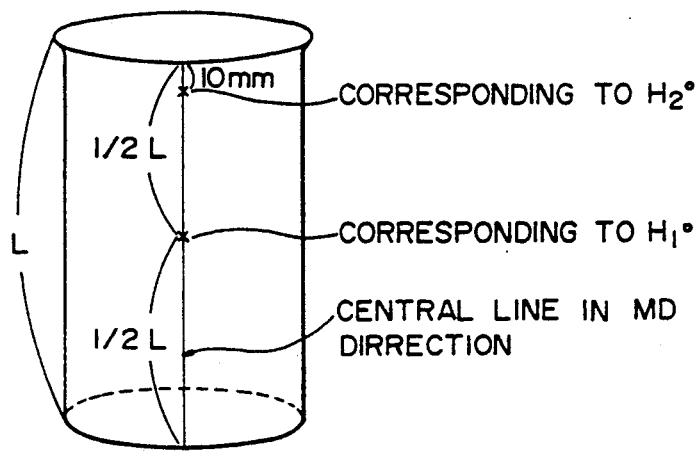
FIG. 5 is a diagram illustrating the measurement position of a coating film.

The measurement positions of the coating film corresponding to $H_1°$ and $H_2°$ are the central part of the can barrel wall on the center line of the MD direction of the coated plate for $H_1°$ and the point distant by 10 mm from the top end of the can on the center line of the MD direction of the coated plate for $H_2°$ (see FIG. 5).

The coated film is sampled in the following manner. Namely, a small piece of the metal plate having a size of 40 mm×40 mm is cut out with the predetermined measurement position being as the center, and the outer surface coating is removed by using emery paper. Then, the metal is dissolved in 6N hydrochloric acid and the coating film is isolated.

In the present invention, in view of the corrosion resistance and heat resistance of the coating, it is preferred that the orientation degree of the coating be at least 30%, especially 35 to 90%.

At the draw-forming and redrawing steps, a lubricant such as liquid paraffin, synthetic paraffin, a hydrogenated edible oil, palm oil, a natural wax or polyethylene wax is preferably coated on the coated metal plate or cup. The amount coated of the lubricant differs according to the kind of the lubricant, but is is preferred that the amount coated of the lubricant be 0.1 to 10 mg/dm², especially 0.2 to 5 mg/dm². The lubricant is applied in the melted state by spray coating.

The formed can is subjected to various processing operations such as doming, necking and flanging to obtain a can barrel for a two-piece can.

EFFECTS OF THE INVENTION

As is apparent from the foregoing description, according to the present invention, since a crystalline thermoplastic resin is sued as the metal plate-coating resin and draw forming is carried out in the state where the coated metal plate is heated at a temperature higher than the glass transition point (Tg) of the coating resin in advance, damage of the coating resin layer can be effectively prevented at the draw-forming step.

Furthermore, according to the present invention, since the coated metal plate is heated at a temperature higher than the glass transition point (Tg) of the coating resin and redraw forming is carried out at a bend-pulling speed of at least 1 m/min, the temperature of the coating resin is elevated by violent deformation and a large molecular orientation is given to the coating resin layer, with the result that the corrosion resistance and heat resistance can be prominently improved.

EXAMPLES

Example 1

A coated metal plate was prepared by heat-bonding a polyethylene terephthalate (PET) film (having a thickness of 20 μm) to both the surfaces of a tin-free steel (TFS) plate having a blank thickness of 0.18 mm and a tempering degree of DR-9, and a lubricant was coated on both the surfaces of the coated metal plate, and the coated metal plate was subjected to draw forming, redraw forming and heat treatment (printing operation) under conditions described below. Then, degreasing, washing, doming, necking and flanging were carried out according to customary procedures to obtain a can barrel for a two-piece can. The obtained results are shown in Table 1. As is apparent from the results shown in Table 1, a thickness-reduced deep-draw-formed can having good heat resistance and corrosion resistance was obtained while the properties of the resin coating were improved.

Forming Conditions (A) Draw Forming
(1) Temperature for heating coated metal plate: 80° C.
(2) Blank diameter: 187 mm
(3) Draw ratio: 1.50
(B) Redraw Forming
(1) Temperature for heating of coated metal cup: 80° C.
(2) Processing speed: 10 m/min
(3) Primary redraw ratio: 1.29
(4) Secondary redraw ratio: 1.24
(5) Third redraw ratio: 1.20
(6) Curvature radius ($R_D$) of working corner of redrawing die: 0.4 mm
(7) Curvature radius ($R_D$) of holding corner: 1.0 mm
(8) Blank holder load: 6000 kg
(9) Thickness reduction ratio (can barrel): −20%

Evaluation (A) Formability
The presence or absence of shock lines and the presence or absence of peeling (delamination) of a resin coating layer were checked, and the metal exposure (enamel rater value) was measured.
(B) Orientation Degree
The orientation degree was measured by the above-mentioned X-ray diffraction method.
(C) Heat Resistance
Damage of a coating layer by dinting after the printing step was checked.
(D) Corrosion Resistance
Cola (carbonated drink) was filled in a thickness-reduced deep-draw-formed can and a lid was seamed to the can. The can was stored at 37° C. for a long period, and the corrosion state of the inner face of the can and the leakage were examined.

Comparative Example 1

A thickness-reduced deep-draw-formed can was prepared in the same manner as described in Example 1 except that an organosol paint (coating thickness was 20

μm) and an epoxy/phenol paint (coating thickness was 20 μm) were coated on the inner and outer surfaces, respectively, of the metal plate and the coatings were baked to form a coated metal plate. The obtained can was evaluated in the same manner as described in Example 1. The obtained results are shown in Table 1. As is seen from the results shown in Table 1, the can was poor in the heat resistance and corrosion resistance and was not suitable as a vessel.

Comparative Example 2

When the forming was carried out in the same manner as described in Example 1 except that the draw forming and redraw forming operations were carried out at room temperature (25° C.), as shown in Table 1, formation of shock lines and delamination of the coating resin layer were conspicuous and a vessel could not be formed.

Comparative Example 3

A thickness-reduced deep-draw-formed can was prepared in the same manner as described in Example 1 except that the forming step at the redraw forming step was changed to 0.1 m/min. The obtained results are shown in Table 1. As is seen from the results shown in Table 1, the formed can was poor in the formability, heat resistance and corrosion resistance and was not suitable as a vessel.

Comparative Example 4

A deep-draw-formed can was prepared in the same manner as described in Example 1 except that at the redraw forming step, the ordinary redraw forming operation not including bend-pulling was carried out ($R_D$ was 1.2 mm in this case). The barrel wall of the obtained can body had a thickness increased by about 10% on the average. The obtained results are shown in Table 1. As is seen from the results shown in Table 1, the obtained can was poor in the heat resistance and corrosion resistance and was not suitable as a vessel.

Example 2

A thickness-reduced deep-draw-formed can was prepared in the same manner as described in Example 1 except that a coated metal plate having the inner surface coated with polyethylene terephthalate (the film thickness was 20 μm) and the outer surface coated with an epoxy/phenol paint (the coating thickness was 20 μm) was used. The obtained results are shown in Table 1. As is seen from the results shown in Table 1, a vessel having excellent formability, heat resistance and corrosion resistance was obtained.

Example 3

A thickness-reduced deep-draw-formed can was prepared in the same manner as described in Example 1 except that an Al-Mg type alloy plate having a blank thickness of 0.24 mm was used and the redraw forming conditions were changed as described below.

Forming Conditions

Changed Redraw Forming Conditions

Curvature radius of working corner of redrawing die: 0.6 mm

Blank holder load: 2000 kg

The obtained results are shown in Table 1. As is seen from the results shown in Table 1, a vessel having excellent formability, heat resistance and corrosion resistance was obtained.

Comparative Example 5

A thickness-reduced deep-draw-formed can was prepared in the same manner as described in Example 1 except that a polypropylene film (having a thickness of 20 μm) was heat-bonded as the coating material to both the inner and outer surfaces of the metal plate, the processing speed at the redraw forming step was changed to 0.1 m/min and the thickness reduction ratio was changed to −30%. The obtained results are shown in Table 1. As is apparent from the results shown in Table 1, the obtained can was poor in the corrosion resistance and was not suitable as a vessel.

TABLE 1

Examples and Comparative Examples

| | Coated Plate | | | Drawing Step | Redrawing Step | | | Formability | | |
|---|---|---|---|---|---|---|---|---|---|---|
| | plate | inner surface | outer surface | temperature | temperature | speed | thickness reduction ratio | SL | delamination | ERV |
| Example 1 | TFS, 0.18 mm | PET | PET | 80° C. | 80° C. | 10 m/min | −20% | no change | no change | below 0.5 mA |
| Comparative Example 1 | TFS, 0.18 mm | polyvinyl chloride organosol | epoxy/ phenol | " | " | " | " | no change | no change | below 0.5 mA |
| Comparative Example 2 | TFS, 0.18 mm | PET | PET | 25° C. | 25° C. | " | " | large | large | not measured |
| Comparative Example 3 | TFS, 0.18 mm | PET | PET | 80° C. | 80° C. | 0.1 m/min | " | small | small | above 100 mA |
| Comparative Example 4 | TFS, 0.18 mm | PET | PET | " | " | 10 m/min | +10% | no change | small | above 50 mA |
| Example 2 | TFS, 0.18 mm | PET | epoxy/ phenol | " | " | " | −20% | no change | no change | below 0.5 mA |
| Example 3 | aluminum, 0.24 mm | PET | PET | " | " | " | −10% | no change | no change | below 0.5 mA |
| Comparative Example 5 | TFS, 0.18 mm | PP | PP | " | " | 0.1 m/min | −30% | no change | no change | below 0.5 mA |

| | Orientation Degree | Heat Resistance | Corrosion Resistance |
|---|---|---|---|
| Example 1 | 50% | no change | no change |
| Comparative Example 1 | 0% | conspicuous cracking | large blister, conspicuous |

TABLE 1-continued

| Examples and Comparative Examples | | | |
|---|---|---|---|
| | | | under-film corrosion |
| Comparative Example 2 | measurement impossible | not evaluated | not evaluated |
| Comparative Example 3 | 55% | no change | large blister, conspicuous under-film corrosion |
| Comparative Example 4 | 20% | cracking | large blister, conspicuous under-film corrosion |
| Example 2 | 52% | no change | no change |
| Example 3 | 42% | no change | no change |
| Comparative Example 5 | 93% | not evaluated | cracking in seamed portion, conspicuous corrosion |

What is claimed is:

1. A process for the preparation of a thickness-reduced deep-draw-formed can, which comprises the steps of laminating a crystalline thermoplastic resin film on a metal plate, heating the laminated metal plate at a temperature $T_1$ higher than the glass transition point (Tg) of the termoplastic resin, and lower than the heat crystallization temperature of the thermoplastic resin.

draw-forming the laminated metal plate at said temperature $T_1$, at a draw ratio of from 1.2 to 1.9 to form a shallow-draw-formed cup, said draw ration being defined by the following formula:

draw-ratio=diameter of blank/diameter of shallow-draw-formed can.

reheating the obtained preliminarily drawn cup at a temperature $T_2$ higher than the glass transition temperature (Tg) of the termosplastic resin, and lower than the heat crystallization temperature of the thermoplastic resin, holding the reheated shallow-draw-formed cup by an annular holding member and a redrawing die arranged coaxially with the annular holding member and a redrawing punch, said redrawing die having a working corner, the working corner having a radius of curvature from 1 to 2.9 times the thickness $t_B$ of the metal plate, and relatively moving the redrawing die and the redrawing punch to redraw the shallow-draw-formed cup into a deep-draw-formed cup having a diameter smaller than the diameter of the shallow-draw-formed cup at said temperature $T_2$ so that the entire side wall of the cup is bent and pulled substantially vertically to the axial direction by the working corner of the redrawing die at a bend-pulling speed of at least 1 m/min. and the thickness reduction ratio of the side wall of the can is 5 to 45%.

2. A process according to claim 1, wherein the crystalline thermoplastic resin is laminated at least on the surface of the metal plate ultimately forming the inner surface coating of the thickness-reduced deep-draw-formed can.

3. A process according to claim 1, wherein the process comprises redraw forming so that the orientation degree of the crystalline thermoplastic resin coated on the barrel wall is at least 30%, said orientation degree being defined by the following formula:

$$F = \frac{1}{2} \times \left( \frac{180° - H_1°}{180°} + \frac{180° - H_2°}{180°} \right) \times 100 \, (\%)$$

wherein $H_1°$ and $H_2°$ represent half widths (°) of the diffraction intensity distribution curve along the Debye-Scherrer ring of the strongest diffraction plane (010) measured by the transmission method using CuKα rays, said $H_1°$ being measured at the coated film of the central part of the can barrel wall on the center line of the MD direction of the coated plate, and said $H_2°$ being measured at the coated film of the point distant by 10 mm from the top end of the can on the center line of the MD direction of the coated plate.

4. A process according to claim 1, wherein the process comprises laminating the metal plate through an adhesive.

* * * * *